(12) United States Patent
Kobayashi et al.

(10) Patent No.: US 9,476,337 B2
(45) Date of Patent: Oct. 25, 2016

(54) ENGINE UNIT AND WORK VEHICLE

(71) Applicant: KOMATSU LTD., Tokyo (JP)

(72) Inventors: Tsuyoshi Kobayashi, Hirakata (JP);
Katsuhiro Tsutsumi, Hitachinaka (JP);
Hirofumi Miyamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/410,767

(22) PCT Filed: May 14, 2013

(86) PCT No.: PCT/JP2013/063367
§ 371 (c)(1),
(2) Date: Dec. 23, 2014

(87) PCT Pub. No.: WO2014/006978
PCT Pub. Date: Jan. 9, 2014

(65) Prior Publication Data
US 2015/0369103 A1 Dec. 24, 2015

(30) Foreign Application Priority Data

Jul. 5, 2012 (JP) .................................. 2012-151163

(51) Int. Cl.
*F01N 13/04* (2010.01)
*F01N 3/20* (2006.01)
(Continued)

(52) U.S. Cl.
CPC ............... *F01N 3/206* (2013.01); *B60K 13/04* (2013.01); *E02F 9/0866* (2013.01); *F01N 3/021* (2013.01); *F01N 3/10* (2013.01); *F01N 3/2066* (2013.01); *F01N 13/009* (2014.06); *F01N 13/011* (2014.06); *F01N 13/08* (2013.01); *F01N 13/1805* (2013.01); *F01N 13/1816* (2013.01); *F01N 13/1822* (2013.01); *B60Y 2200/412* (2013.01); *F01N 3/035* (2013.01); *F01N 3/2882* (2013.01); *F01N 2250/02* (2013.01);
(Continued)

(58) Field of Classification Search
CPC .......................... F01N 13/0093; F01N 13/011
See application file for complete search history.

(56) References Cited

U.S. PATENT DOCUMENTS

| 4,137,983 | A | 2/1979 | Gray |
| 2008/0314033 | A1 | 12/2008 | Aneja et al. |

(Continued)

FOREIGN PATENT DOCUMENTS

| AU | 3205877 A | 7/1979 |
| CN | 101835963 A | 9/2010 |

(Continued)

*Primary Examiner* — Jonathan Matthias
(74) *Attorney, Agent, or Firm* — Drinker Biddle & Reath LLP

(57) ABSTRACT

Two sets of assemblies are arranged such that a diesel particulate filter device of the assembly, a selective catalytic reduction device of the assembly, a selective catalytic reduction device of the assembly, and a diesel particulate filter device of the assembly are located next to each other in this order. Exhaust tubes are provided to extend upward from gas outlets of the selective catalytic reduction device of the assembly and the selective catalytic reduction device of the assembly. The two exhaust tubes are located on a virtual plane orthogonal to longitudinal directions of the selective catalytic reduction devices of the assemblies. Thereby, an air intake position for an engine can be easily set to a position from which exhaust gas from the engine is less likely to be taken in, in a configuration provided with two sets of assemblies.

4 Claims, 14 Drawing Sheets

(51) Int. Cl.
*B60K 13/04* (2006.01)
*E02F 9/08* (2006.01)
*F01N 13/18* (2010.01)
*F01N 13/00* (2010.01)
*F01N 3/021* (2006.01)
*F01N 3/10* (2006.01)
*F01N 13/08* (2010.01)
*F01N 3/28* (2006.01)
*F01N 3/035* (2006.01)

(52) U.S. Cl.
CPC ........ *F01N2340/02* (2013.01); *F01N 2340/04* (2013.01); *F01N 2470/16* (2013.01); *F01N 2470/18* (2013.01); *F01N 2470/20* (2013.01); *F01N 2590/06* (2013.01); *F01N 2590/08* (2013.01); *F01N 2610/02* (2013.01); *F01N 2610/1406* (2013.01); *F01N 2610/1453* (2013.01); *Y02T 10/20* (2013.01); *Y02T 10/24* (2013.01)

(56) References Cited

U.S. PATENT DOCUMENTS

| | | | |
|---|---|---|---|
| 2010/0000203 A1* | 1/2010 | Kowada | B01D 46/0027 60/286 |
| 2010/0031644 A1 | 2/2010 | Keane et al. | |
| 2010/0186381 A1 | 7/2010 | Charles et al. | |
| 2010/0186394 A1 | 7/2010 | Harrison et al. | |
| 2010/0218488 A1 | 9/2010 | Yokota | |
| 2011/0079003 A1 | 4/2011 | Sun et al. | |
| 2011/0088376 A1 | 4/2011 | Kowada | |
| 2011/0146252 A1 | 6/2011 | Silver et al. | |
| 2011/0214416 A1 | 9/2011 | Kowada et al. | |
| 2012/0167558 A1 | 7/2012 | Svihla et al. | |
| 2012/0222413 A1 | 9/2012 | Golin et al. | |
| 2012/0247861 A1 | 10/2012 | Mizuno et al. | |
| 2012/0273648 A1 | 11/2012 | Maske et al. | |
| 2013/0067891 A1 | 3/2013 | Hittle et al. | |
| 2013/0199160 A1* | 8/2013 | Kruer | F01N 3/08 60/274 |
| 2013/0213726 A1 | 8/2013 | Okada | |
| 2013/0319787 A1 | 12/2013 | Kobayashi et al. | |

FOREIGN PATENT DOCUMENTS

| | | |
|---|---|---|
| DE | 10 2012 205350 A1 | 10/2013 |
| JP | S51-151824 U | 12/1976 |
| JP | H08-21234 A | 1/1996 |
| JP | 9-68034 A | 3/1997 |
| JP | 2004-075009 A | 3/2004 |
| JP | 2006-444222 A | 6/2006 |
| JP | 2007-222819 A | 9/2007 |
| JP | 2008-240676 A | 10/2008 |
| JP | 2008-274851 A | 11/2008 |
| JP | 2009-68415 A | 4/2009 |
| JP | 2009-103016 A | 5/2009 |
| JP | 2010-38019 A | 2/2010 |
| JP | 2012-097413 A | 5/2012 |
| JP | 2012-117397 A | 6/2012 |
| WO | WO-2011/152306 A1 | 12/2011 |
| WO | WO 2012/114801 A1 | 8/2012 |

* cited by examiner

ENGINE UNIT AND WORK VEHICLE

TECHNICAL FIELD

The present invention relates to an engine unit and a work vehicle.

BACKGROUND ART

A work vehicle such as a hydraulic excavator, a bulldozer, or a wheel loader is equipped with an exhaust gas treatment device. Examples of the exhaust gas treatment device include a diesel particulate filter (DPF) device, a diesel oxidation catalyst (DOC) device, and a selective catalytic reduction (SCR) device.

A work vehicle equipped with an exhaust gas treatment device is disclosed, for example, in Japanese Patent Laying-Open No. 2012-097413 (see PTD 1).

In this publication, a table is arranged above an upper frame with support legs interposed therebetween, and a first exhaust gas treatment device and a second exhaust gas treatment device constituting an exhaust gas treatment unit are arranged above the table. An engine and the first exhaust gas treatment device are connected by a connection pipe.

CITATION LIST

Patent Document

PTD 1: Japanese Patent Laying-Open No. 2012-097413

SUMMARY OF INVENTION

Technical Problem

Preferably, an air intake position for the air used for combustion in an engine is located at a position from which exhaust gas from the engine is not taken in.

Here, a vehicle equipped with a large engine may have an insufficient exhaust gas treatment capability, and thus it is contemplated to provide such a vehicle with a plurality of exhaust gas treatment units in order to improve exhaust gas treatment capability. However, when a plurality of exhaust gas treatment units are provided, there are a plurality of gas exhaust positions, and thus it becomes difficult to set an air intake position.

The present invention has been made in view of the above problem, and one object of the present invention is to provide an engine unit and a work vehicle in which an air intake position for the air used for combustion in an engine can be easily set to a position from which exhaust gas from the engine is less likely to be taken in, in a configuration provided with a plurality of exhaust gas treatment units.

Solution to Problem

An engine unit in accordance with the present invention includes an engine, a first exhaust gas treatment device, a second exhaust gas treatment device, a third exhaust gas treatment device, a fourth exhaust gas treatment device, a first exhaust pipe, and a second exhaust pipe. The first exhaust gas treatment device treats exhaust gas from the engine. The second exhaust gas treatment device treats the exhaust gas that has passed through the first exhaust gas treatment device. The third exhaust gas treatment device treats the exhaust gas from the engine. The fourth exhaust gas treatment device treats the exhaust gas that has passed through the third exhaust gas treatment device. The first exhaust pipe extends upward from a gas outlet of the second exhaust gas treatment device. The second exhaust pipe extends upward from a gas outlet of the fourth exhaust gas treatment device. The first to fourth exhaust gas treatment devices are arranged to be located next to each other in an order of the first exhaust gas treatment device, the second exhaust gas treatment device, the fourth exhaust gas treatment device, and the third exhaust gas treatment device, such that respective longitudinal directions thereof are arranged in parallel. The first exhaust pipe of the second exhaust gas treatment device and the second exhaust pipe of the fourth exhaust gas treatment device are arranged to be located next to each other on the same end side in the longitudinal direction of the second exhaust gas treatment device and the longitudinal direction of the fourth exhaust gas treatment device.

According to the engine unit in accordance with the present invention, since the first to fourth exhaust gas treatment devices are provided, exhaust gas treatment capability can be improved, and a sufficient exhaust gas treatment capability can be obtained even for a vehicle equipped with a large engine.

Further, the second and fourth exhaust gas treatment devices adjacent to each other are respectively provided with the first and second exhaust pipes, and the first and second exhaust pipes are arranged to be located next to each other on the same end side in the respective longitudinal directions of the second and fourth exhaust gas treatment devices. Thus, the first and second exhaust pipes can be positioned to be close to each other, and the direction in which the exhaust gas flows is easily recognized. Therefore, an air intake position for the air used for combustion in the engine can be easily set to a position from which the exhaust gas from the engine is less likely to be taken in.

In the engine unit described above, the first exhaust gas treatment device and the second exhaust gas treatment device, the second exhaust gas treatment device and the fourth exhaust gas treatment device, and the fourth exhaust gas treatment device and the third exhaust gas treatment device are each arranged separately with a gap therebetween, as seen in a plan view.

Thereby, the first to fourth exhaust gas treatment devices can be arranged closely, with gaps therebetween.

The engine unit further includes a first intermediate connection pipe connecting between the first exhaust gas treatment device and the second exhaust gas treatment device, and a second intermediate connection pipe connecting between the third exhaust gas treatment device and the fourth exhaust gas treatment device. Each of a gap between the first exhaust gas treatment device and the second exhaust gas treatment device, a gap between the second exhaust gas treatment device and the fourth exhaust gas treatment device, and a gap between the fourth exhaust gas treatment device and the third exhaust gas treatment device is smaller than a diameter of the first intermediate connection pipe and a diameter of the second intermediate connection pipe, as seen in a plan view.

Thereby, the first to fourth exhaust gas treatment devices can be arranged closely, and thus the first to fourth exhaust gas treatment devices can be arranged in a compact manner.

A work vehicle in accordance with the present invention has the engine unit according to any of the above descriptions.

In the work vehicle in accordance with the present invention, an air intake position for the engine can be easily set to a position from which the exhaust gas from the engine is less likely to be taken in, in a configuration provided with a plurality of exhaust gas treatment units.

ADVANTAGEOUS EFFECTS OF INVENTION

As described above, according to the present invention, an engine unit and a work vehicle in which an air intake position for the air used for combustion in an engine can be easily set to a position from which exhaust gas from the engine is less likely to be taken in, in a configuration provided with a plurality of exhaust gas treatment units, can be achieved.

BRIEF DESCRIPTION OF DRAWINGS

FIG. 2 is a partially see-through perspective view showing the vicinity of an engine compartment of the hydraulic excavator shown in FIG. 1 in an enlarged manner, with an engine and an exhaust gas treatment structure therein being seen through.

DESCRIPTION OF EMBODIMENTS

Figure 1:
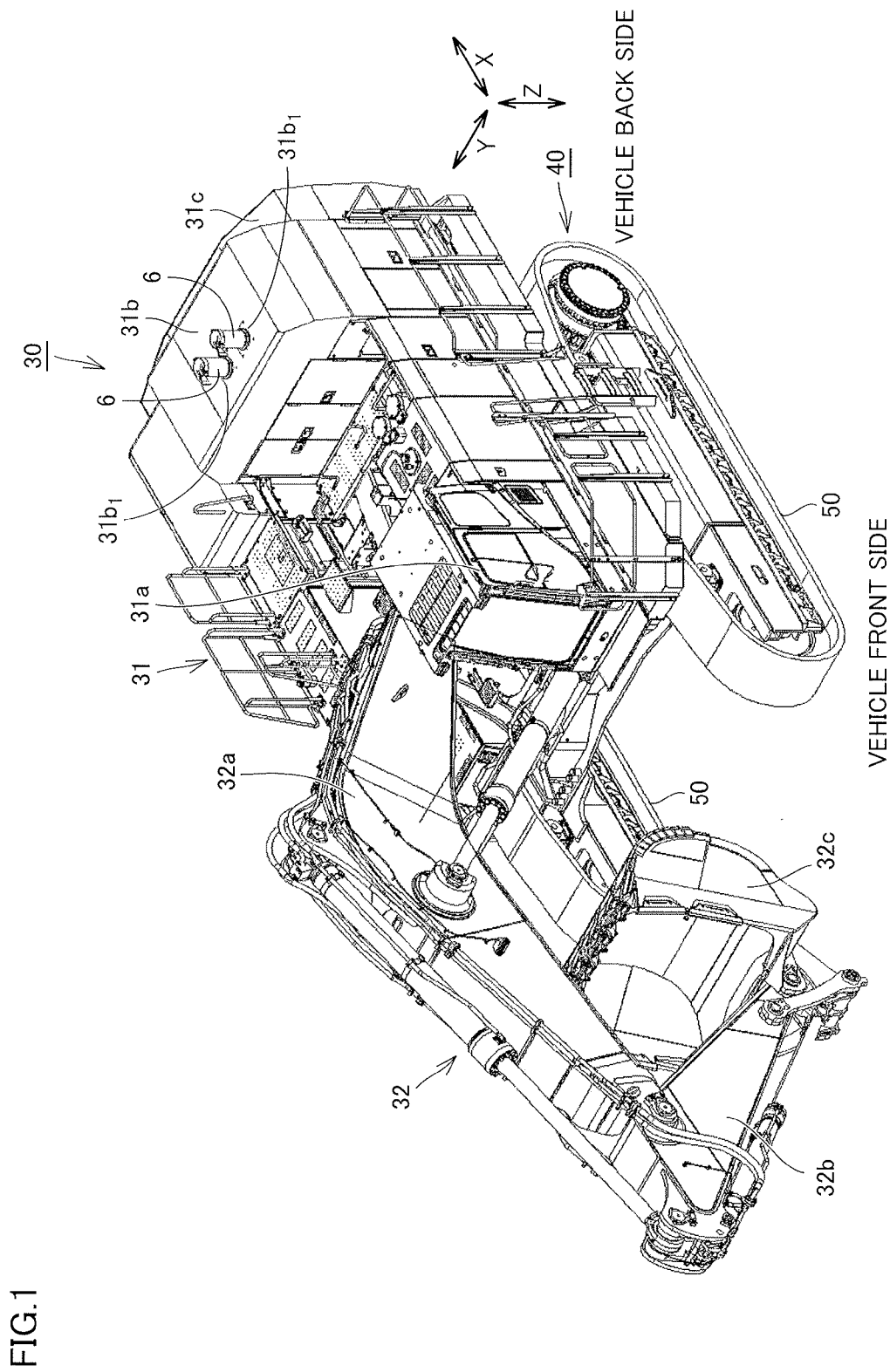
FIG. 1 is a perspective view schematically showing a configuration of a hydraulic excavator in one embodiment of the present invention.

Hereinafter, an embodiment of the present invention will be described with reference to the drawings.

First, a configuration of a hydraulic excavator as an example of a work vehicle in the embodiment of the present invention will be described with reference to FIG. 1. However, the present invention is applicable to a work vehicle equipped with an engine unit including an exhaust gas treatment unit, such as a wheel loader, a bulldozer, or the like.

In the following description of the drawings, the fore-and-aft direction means the fore-and-aft direction of a hydraulic excavator 30. In other words, the fore-and-aft direction means the fore-and-aft direction with respect to an operator sitting on an operator's seat in a cab 31a. The right-and-left direction or the lateral direction means the vehicular width direction of hydraulic excavator 30. In other words, the right-and-left direction, the vehicular width direction, or the lateral direction is the right-and-left direction with respect to the aforementioned operator. In addition, in the drawings referenced below, the fore-and-aft direction is indicated by an arrow X, the right-and-left direction is indicated by an arrow Y, and the top-and-bottom direction is indicated by an arrow Z.

FIG. 1 is a perspective view schematically showing a configuration of a hydraulic excavator in one embodiment of the present invention. Referring to FIG. 1, hydraulic excavator 30 in the present embodiment mainly has a travel base structure 40, a revolving superstructure 31, and a work implement 32. Travel base structure 40 and revolving superstructure 31 constitute a main body of the work vehicle.

Travel base structure 40 has a pair of right and left crawler belt devices 50. Each of the pair of right and left crawler belt devices 50 has a crawler belt. Hydraulic excavator 30 is configured to self-propel by rotationally driving the pair of right and left crawler belt devices 50.

Revolving superstructure 31 is mounted revolvably with respect to travel base structure 40. Revolving superstructure 31 has cab 31a on a front left side (vehicle front side), and has an engine compartment accommodating an engine unit (an engine, an exhaust gas treatment structure, and the like) and a counterweight 31c on a back side (vehicle back side). The top of the engine compartment is covered with an engine hood 31b. Counterweight 31c is arranged at the back of the engine compartment.

Work implement 32 is pivotally supported on the front side of revolving superstructure 31, and has, for example, a boom 32a, an arm 32b, a bucket 32c, hydraulic cylinders, and the like. Boom 32a has a base end portion rotatably coupled to revolving superstructure 3. Arm 32b has a base end portion rotatably coupled to the leading end portion of boom 32a. Bucket 32c is rotatably coupled to the leading end portion of arm 32b. Work implement 32 can be driven by driving each of boom 32a, arm 32b, and bucket 32c by the hydraulic cylinder.

Next, a configuration of the engine unit (including an engine, an exhaust gas treatment structure, and connection pipes) mounted in the hydraulic excavator will be described with reference to FIGS. 2 to 9.

Figure 2:
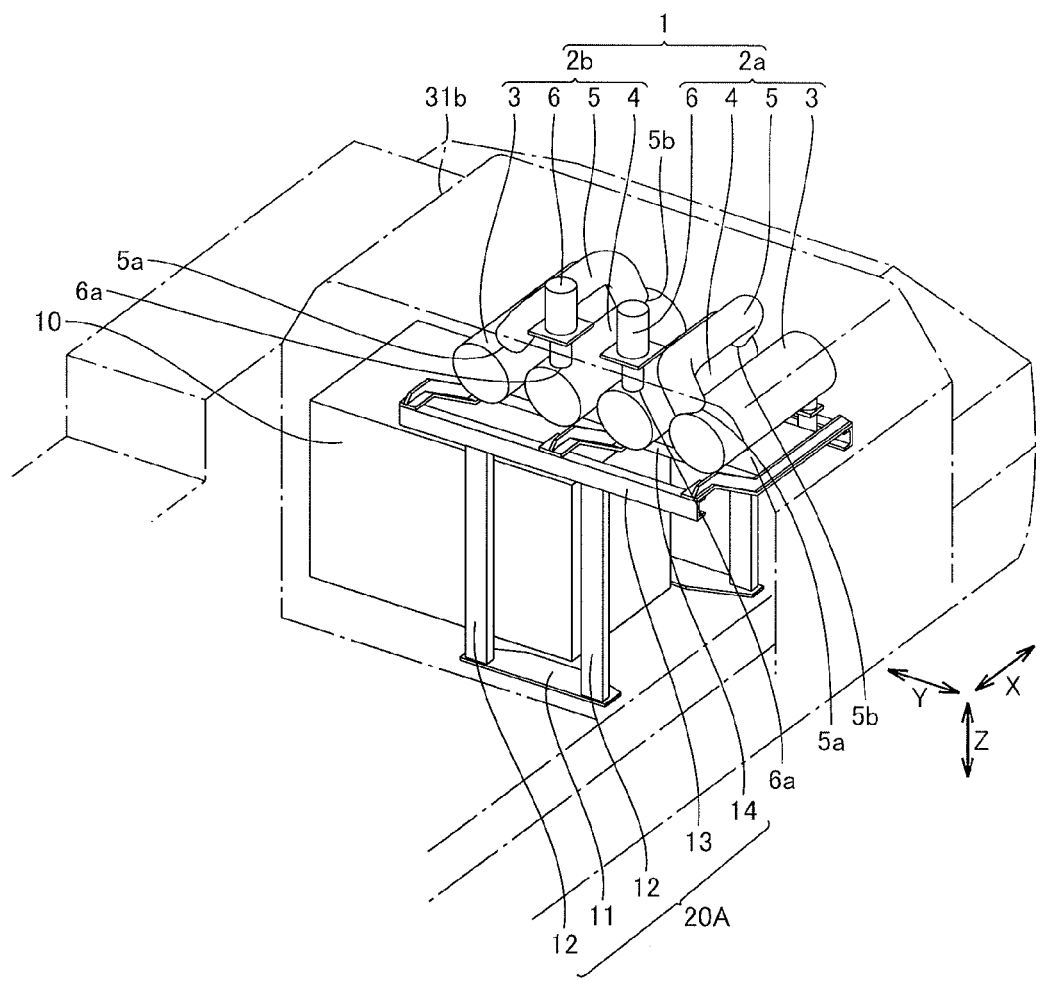

FIG. 2 is a partially see-through perspective view showing the vicinity of the engine compartment of the hydraulic excavator shown in FIG. 1 in an enlarged manner, with an engine and an exhaust gas treatment structure therein being seen through. Referring to FIG. 2, in the engine compartment, the engine unit is arranged as described above. This engine unit mainly has an engine 10, an exhaust gas treatment structure 1, a support 20A, and first and second connection pipes 7a, 7b (in FIG. 3 and the like).

Engine 10 is a large diesel engine having a displacement of, for example, 20 liters or more.

Exhaust gas treatment structure 1 is arranged above engine 10. This exhaust gas treatment structure 1 has two sets of assemblies (first and second exhaust gas treatment units) 2a, 2b. Assembly 2a (the first exhaust gas treatment unit) has a first exhaust gas treatment device 3, a second exhaust gas treatment device 4, a first intermediate connection pipe 5, and an exhaust tube 6 (a first exhaust pipe). Assembly 2b (the second exhaust gas treatment unit) has a third exhaust gas treatment device 3, a fourth exhaust gas treatment device 4, a second intermediate connection pipe 5, and an exhaust tube 6 (a second exhaust pipe).

As the combination of first and second exhaust gas treatment devices 3, 4, an appropriate combination may be selected from a diesel particulate filter device, a diesel oxidation catalyst device, and a selective catalytic reduction device. As the combination of third and fourth exhaust gas treatment devices 3, 4 as well, an appropriate combination may be selected from a diesel particulate filter device, a diesel oxidation catalyst device, and a selective catalytic reduction device.

In the present embodiment, first and third exhaust gas treatment devices 3, 3 are each a diesel particulate filter device, for example, and second and fourth exhaust gas treatment devices 4, 4 are each a selective catalytic reduction device 4, for example. First and second intermediate connection pipes 5, 5 are each a mixing pipe, for example.

Diesel particulate filter device 3 is a device which treats exhaust gas from engine 10, and mainly has a filter (not shown) and a heater (not shown) provided in association with the filter. Diesel particulate filter device 3 is configured to collect, by means of the filter, particulate matter contained in the exhaust gas of the engine, and burn the collected particulate matter. The filter is made of ceramic, for example.

Selective catalytic reduction device 4 is a device which treats the exhaust gas from engine 10, for reducing nitrogen oxide $NO_x$ through hydrolysis of a reducing agent, for example, an aqueous urea solution. In principle, selective catalytic reduction device 4 applies that ammonia ($NH_3$) chemically reacts with nitrogen oxide ($NO_x$) and is accordingly reduced to nitrogen ($N_2$) and water ($H_2O$). However, since it is dangerous to load hydraulic excavator 30 with ammonia, hydraulic excavator 30 is equipped with an aqueous urea solution tank 21 (FIG. 9) containing an aqueous urea solution for example, as a reducing agent tank. It should be noted that the reducing agent is not limited to the aqueous urea solution and may be any agent which can reduce nitrogen oxide $NO_x$.

Mixing pipe 5 connects between diesel particulate filter device 3 and selective catalytic reduction device 4 to each other. Namely, by means of mixing pipe 5, diesel particulate filter device 3 and selective catalytic reduction device 4 are connected to each other. Mixing pipe 5 is a portion for injecting, for example, an aqueous urea solution into the exhaust gas directed from diesel particulate filter device 3 toward selective catalytic reduction device 4 and mixing urea with the exhaust gas.

Exhaust tube 6 is connected to selective catalytic reduction device 4 to extend upward from a gas outlet 6a of selective catalytic reduction device 4. Exhaust tube 6 is provided to emit the exhaust gas which has passed through diesel particulate filter device 3 and selective catalytic reduction device 4 into the atmosphere. Exhaust tube 6 protrudes upward through engine hood 31b.

The two sets of assemblies 2a, 2b are arranged such that diesel particulate filter device 3 of assembly 2a, selective catalytic reduction device 4 of assembly 2a, selective catalytic reduction device 4 of assembly 2b, and diesel particulate filter device 3 of assembly 2b are located next to each other in this order, as seen in a plan view.

The two sets of assemblies 2a, 2b are supported by support 20A to be located above engine 10. Support 20A is provided to support exhaust gas treatment structure 1, and has plate boards 11 placed on a vehicular body frame, vertical frames 12, a lateral frame 13, sub brackets 14, and small brackets (not shown). Details of the configuration of support 20A will be described later.

Figure 3:
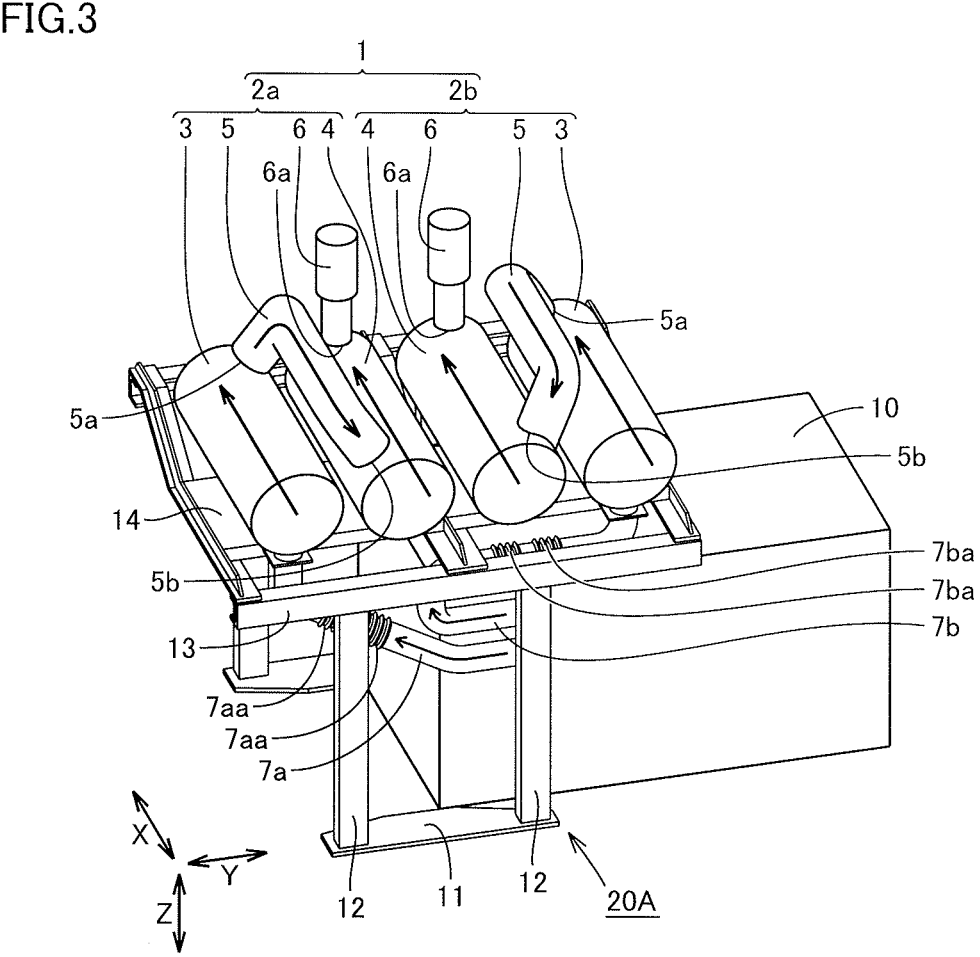
FIG. 3 is a schematic perspective view showing the engine and the exhaust gas treatment structure of the hydraulic excavator shown in FIG. 1, from diagonally backward.

FIG. 3 is a schematic perspective view showing the engine and the exhaust gas treatment structure of the hydraulic excavator shown in FIG. 1, from diagonally backward. Referring to FIG. 3, in the engine unit of the present embodiment, exhaust gas treatment structure 1 and engine 10 are connected to each other by first and second connection pipes 7a, 7b.

Namely, first connection pipe 7a guides the exhaust gas from engine 10 to diesel particulate filter device 3 of assembly 2a. Second connection pipe 7b guides the exhaust gas from engine 10 to diesel particulate filter device 3 of assembly 2b.

First and second connection pipes 7a, 7b are bellows expansion pipe joints having expandable bellows parts 7aa, 7ba, respectively. For the sake of thermal resistance and corrosion resistance, first and second connection pipes 7a, 7b are each made of a steel material such as stainless steel, for example.

First connection pipe 7a is provided with two bellows portions 7aa, 7aa, for example, as bellows part 7aa. Second connection pipe 7b is provided with two bellows portions 7ba, 7ba, for example, as bellows part 7ba. However, the number of bellows portions 7aa, 7ba provided in first and second connection pipes 7a, 7b, respectively, is not limited thereto, and may be one or three or more. In addition, the number of bellows portions 7aa provided in first connection pipes 7a may not be identical to, that is, may be different from, the number of bellows portions 7ba provided in second connection pipe 7b.

Figure 4:
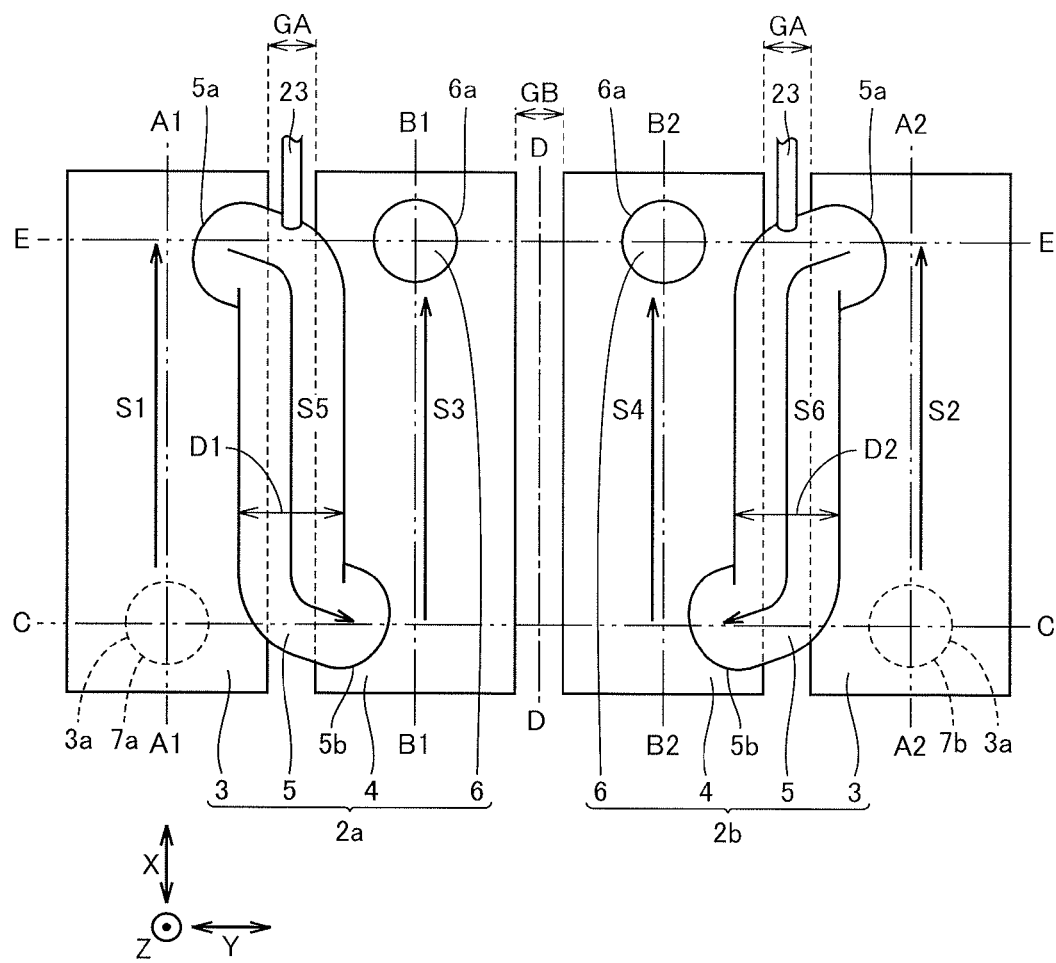
FIG. 4 is a plan view schematically showing a configuration of the exhaust gas treatment structure shown in FIG. 3, from above.

FIG. 4 is a plan view schematically showing a configuration of the exhaust gas treatment structure shown in FIG. 3, from above. Referring to FIG. 4, diesel particulate filter device 3 of each of assemblies 2a, 2b has a substantially cylindrical contour. Selective catalytic reduction device 4 of each of assemblies 2a, 2b has a substantially cylindrical contour.

Constituent devices 3, 4, which are two diesel particulate filter devices 3 and two selective catalytic reduction devices 4, extend longer in the direction of central axis lines A1, A2, B1, B2 of the cylindrical shapes than in the radial direction. Thus, the longitudinal direction of each of constituent devices 3, 4 corresponds to the direction of each of the aforementioned central axis lines A1, A2, B1, B2.

Constituent devices 3, 4 are arranged such that respective longitudinal directions thereof are arranged in parallel as seen in a plan view. Namely, constituent devices 3, 4 are arranged such that respective central axis lines A1, A2, B1, B2 thereof are arranged in parallel. As long as respective central axis lines A1, A2, B1, B2 of constituent devices 3, 4 extend (run) next to each other, they may or may not be in parallel with each other.

Two diesel particulate filter devices 3 have respective one ends in longitudinal directions A1, A2 that are provided with gas inlets 3a to which first and second connection pipes 7a, 7b are connected, respectively. Two diesel particulate filter devices 3 have respective other ends in longitudinal directions A1, A2 that are provided with gas outlets 5a to which mixing pipes 5 are connected, respectively. Thus, two diesel particulate filter devices 3 are configured such that exhaust gas moves therein through paths, as indicated by arrows S1, S2, in longitudinal directions A1; A2 of diesel particulate filter devices 3, respectively.

Two selective catalytic reduction devices 4 have respective one ends in their longitudinal directions that are provided with gas inlets 5b to which mixing pipes 5 are connected, respectively. Two selective catalytic reduction devices 4 have respective other ends in longitudinal directions B1, B2 that are provided with gas outlets 6a to which exhaust tubes 6 are connected, respectively. Thus, two selective catalytic reduction devices 4 are configured such that exhaust gas moves therein through paths, as indicated by arrows S3, S4, in longitudinal directions B1, B2 of selective catalytic reduction devices 4, respectively. The direction in which exhaust gas moves in selective catalytic reduction device 4 is the same as the direction in which exhaust gas moves in diesel particulate filter device 3.

In addition, two mixing pipes 5 are configured such that exhaust gas moves therein through paths, as indicated by arrows S5, S6, in the longitudinal directions of mixing pipes 5, respectively. The direction in which exhaust gas moves in mixing pipe 5 is opposite to the direction in which exhaust gas moves in each of diesel particulate filter device 3 and selective catalytic reduction device 4.

Two diesel particulate filter devices 3 and two selective catalytic reduction devices 4 are located next to each other along a direction which crosses (for example, which is orthogonal to) longitudinal directions A1, A2, B1, B2. More specifically, respective longitudinal directions A1, A2, B1, B2 of two diesel particulate filter devices 3 and two selective catalytic reduction devices 4 extend in the fore-and-aft direction (X direction) of hydraulic excavator 30, and two diesel particulate filter devices 3 and two selective catalytic reduction devices 4 are located next to each other along the right-and-left direction (Y direction) of hydraulic excavator 30.

Regarding an exhaust path in exhaust gas treatment structure 1, exhaust gas moves from one end side to the other end side in longitudinal direction A1 of diesel particulate filter device 3. Then, the exhaust gas turns in the opposite direction through mixing pipe 5 and reaches one end side in longitudinal direction B1 of selective catalytic reduction device 4. Thereafter, the exhaust gas turns again in the opposite direction in selective catalytic reduction device 4 to move from one end side to the other end side in longitudinal direction B1 of selective catalytic reduction device 4, and is emitted from exhaust tube 6. Thus, the exhaust path is for example in the S shape as seen in a plan view.

Respective gas inlets 3a of two diesel particulate filter devices 3 are arranged on the same side (lower side as seen in the drawing) in longitudinal directions A1, A2. When respective longitudinal directions A1, A2 of two diesel particulate filter devices 3 are parallel to each other as seen in a plan view, respective gas inlets 3a of two diesel particulate filter devices 3 are arranged to include a virtual plane C orthogonal to both longitudinal directions A1, A2.

Exhaust tube 6 of assembly 2a and exhaust tube 6 of assembly 2b are arranged to be located next to each other to include a virtual plane E orthogonal to both longitudinal direction B1 of selective catalytic reduction device 4 of assembly 2a and longitudinal direction B2 of selective catalytic reduction device 4 of assembly 2b. Namely, two exhaust tubes 6 are arranged to be close to each other by being arranged on the same end side (the side opposite to gas inlets 5b) in longitudinal directions B1, B2 of two selective catalytic reduction devices 4, without sandwiching any other exhaust gas treatment device therebetween as seen in a plan view.

As seen in a plan view, diesel particulate filter device 3 and selective catalytic reduction device 4 of assembly 2a are arranged line-symmetrically to diesel particulate filter device 3 and selective catalytic reduction device 4 of assembly 2b with respect to a virtual line D extending in the longitudinal direction between two selective catalytic reduction devices 4.

A gap GA between diesel particulate filter device 3 and selective catalytic reduction device 4 in assembly 2a and a gap GB between selective catalytic reduction devices 4 are smaller than diameters D1, D2 of two respective mixing pipes 5. A gap GA between diesel particulate filter device 3 and selective catalytic reduction device 4 in assembly 2b and gap GB between selective catalytic reduction devices 4 are smaller than diameters D1, D2 of two respective mixing pipes 5.

In addition, as seen in a plan view, respective gaps GA between diesel particulate filter device 3 and selective catalytic reduction device 4 in assemblies 2a, 2b also overlap respective mixing pipes 5 in assemblies 2a, 2b.

Figure 5:
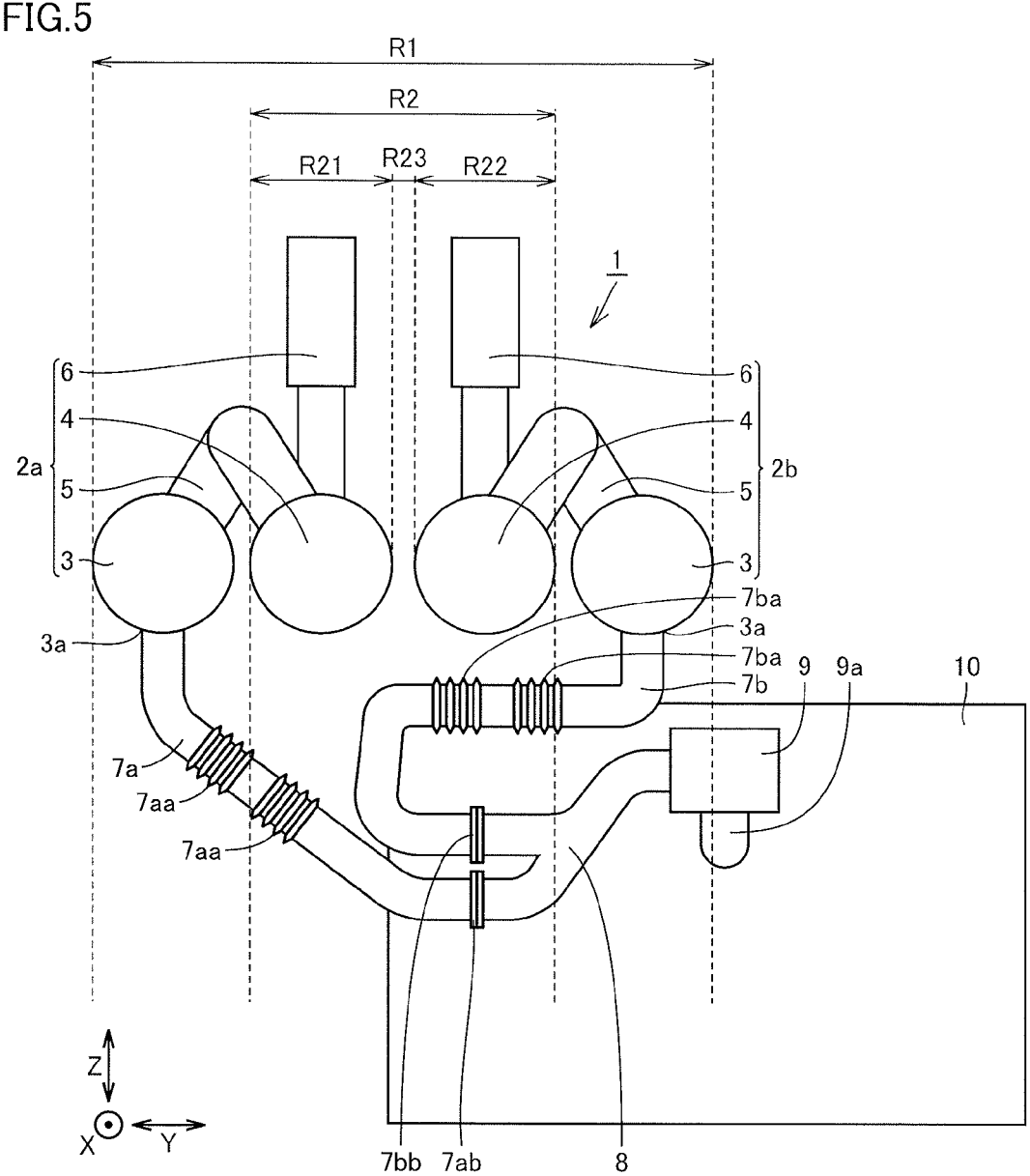
FIG. 5 is a back view schematically showing the engine, the exhaust gas treatment structure, and connection pipes shown in FIG. 3, from backward.

FIG. 5 is a back view (rear view) schematically showing the engine, the exhaust gas treatment structure, and the connection pipes shown in FIG. 3, from the vehicle back side (rear side). Referring to FIG. 5, first connection pipe 7a has one end 7ab connected to an exhaust port 9a of engine 10 with a branch pipe 8 and a supercharger 9 interposed therebetween. First connection pipe 7a has the other end connected to gas inlet 3a of diesel particulate filter device 3 in assembly 2a.

The other end of first connection pipe 7a may be connected directly to gas inlet 3a of diesel particulate filter device 3 in assembly 2a without another pipe interposed therebetween, or connected indirectly thereto with another pipe interposed therebetween. In addition, one end 7ab of first connection pipe 7a may be connected to exhaust port 9a of engine 10 without supercharger 9 interposed therebetween.

First connection pipe 7a has a laterally extending portion extending in the Y direction from one end 7ab, a tilt portion extending from the laterally extending portion at a predetermined tilt angle with respect to the Y direction, and a vertically extending portion extending in the Z direction from the tilt portion to be connected to diesel particulate filter device 3. Bellows part 7aa is provided in the tilt portion.

Second connection pipe 7b has one end 7bb connected to exhaust port 9a of engine 10 with branch pipe 8 and supercharger 9 interposed therebetween. Second connection pipe 7b has the other end connected to gas inlet 3a of diesel particulate filter device 3 in assembly 2b.

The other end of second connection pipe 7b may be connected directly to gas inlet 3a of diesel particulate filter device 3 in assembly 2b without another pipe interposed therebetween, or connected indirectly thereto with another pipe interposed therebetween. In addition, one end 7bb of second connection pipe 7b may be connected to exhaust port 9a of engine 10 without supercharger 9 interposed therebetween.

Second connection pipe 7b has a first laterally extending portion extending in the Y direction from one end 7bb, a first vertically extending portion extending in the Z direction from the first laterally extending portion, a second laterally extending portion extending in the Y direction from the first vertically extending portion to guide exhaust gas in a direction opposite to the first laterally extending portion, and a second vertically extending portion extending in the Z direction from the second laterally extending portion to be connected to diesel particulate filter device 3. Namely, second connection pipe 7b has the second laterally extending portion which turns, after second connection pipe 7b extends to one side in the Y direction in the first laterally extending portion, in a direction opposite to the one side. Bellows part 7ba is provided in the second laterally extending portion.

At least a portion of assembly 2b is arranged at a position overlapping engine 10 as seen in a plan view. Diesel particulate filter device 3, selective catalytic reduction device 4, mixing pipe 5, and exhaust tube 6 of assembly 2b are arranged at the position overlapping engine 10 as seen in a plan view, and arranged in a region directly above engine 10.

On the other hand, assembly 2a is arranged at a position not overlapping engine 10 as seen in a plan view. Diesel particulate filter device 3, selective catalytic reduction device 4, mixing pipe 5, and exhaust tube 6 of assembly 2a are arranged at the position not overlapping engine 10 as seen in a plan view, and arranged to be away from the region directly above engine 10.

First connection pipe 7a is routed through a region directly underneath an arrangement region R2 in the drawing, and connected to diesel particulate filter device 3 of assembly 2a. Second connection pipe 7b is routed through the region directly underneath arrangement region R2 in the drawing, and connected to diesel particulate filter device 3 of assembly 2b.

Here, arrangement region R2 is a region including regions R21, R22 where selective catalytic reduction devices 4, 4 of assembly 2a, 2b are arranged, respectively, and a region R23 between selective catalytic reduction device 4 of assembly 2a and selective catalytic reduction device 4 of assembly 2b.

In addition, the region directly underneath arrangement region R2 is a region located in a direction (Z direction) orthogonal to a plane constituted by a direction in which two selective catalytic reduction devices 4, 4 face each other (for example, the Y direction) and longitudinal directions B1, B2 of two selective catalytic reductions devices 4, 4 (for example, the X direction), with respect to arrangement region R2.

Namely, both of first connection pipes 7a, 7b are routed through at least a partial region of a region directly underneath selective catalytic reduction device 4 of assembly 2a and a region directly underneath selective catalytic reduction device 4 of assembly 2b.

One ends 7ab, 7bb (connection ends on a side close to the engine) of respective first and second connection pipes 7a, 7b are preferably located in a region R1 directly underneath exhaust gas treatment structure 1, and more preferably located in the region directly underneath arrangement region R2.

Namely, one ends 7ab, 7bb of the respective first and second connection pipes are preferably located in at least a portion of a region directly underneath assembly 2a and a region directly underneath assembly 2b, or at least a portion of region R23 directly underneath between assembly 2a and assembly 2b. In addition, one ends 7ab, 7bb of the respective first and second connection pipes are more preferably located in at least a portion of regions R21, R22 directly underneath selective catalytic reduction device 4 of assembly 2a and selective catalytic reduction device 4 of assembly 2b, respectively, or at least a portion of region R23 directly underneath between selective catalytic reduction device 4 of assembly 2a and selective catalytic reduction device 4 of assembly 2b.

Next, a structure supporting the engine and the exhaust gas treatment structure will be described with reference to FIGS. 6 to 8.

Figure 6:
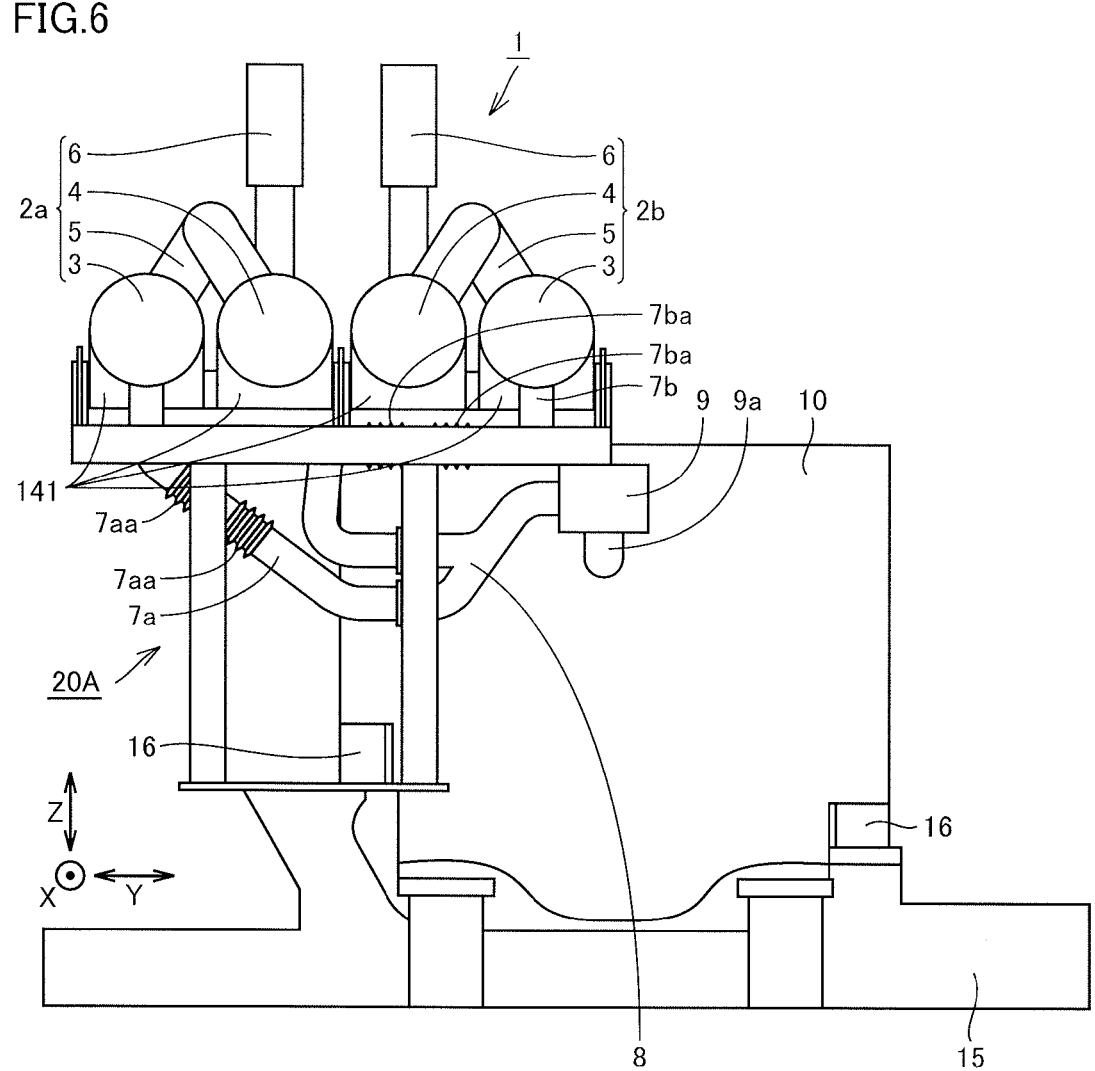
FIG. 6 is a back view (rear view) schematically showing a configuration in which the engine and the exhaust gas treatment structure are supported on a frame independently of each other, from backward (a rear side).
Figure 7:
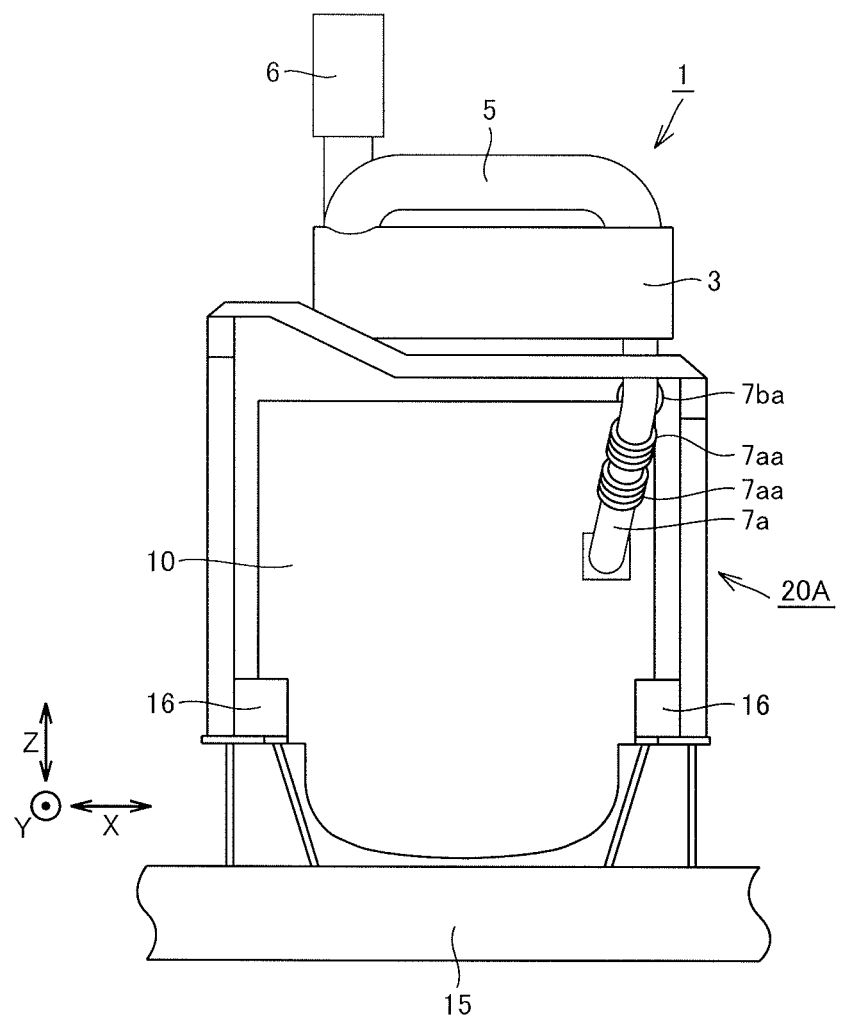
FIG. 7 is a side view schematically showing the configuration in which the exhaust gas treatment structure and the engine are supported on the frame independently of each other, from a side.

FIGS. 6 and 7 are a back view and a side view schematically showing a configuration in which the engine and the exhaust gas treatment structure are supported on a frame independently of each other, from backward and from a side, respectively. Referring to FIGS. 6 and 7, in the present embodiment, engine 10 and exhaust gas treatment structure 1 are supported on a vehicular body frame 15 independently of each other.

Specifically, engine 10 is supported on vehicular body frame 15 with rubber dampers 16 interposed therebetween. Rubber dampers 16 suppress vibration of engine 10 from being transmitted to vehicular body frame 15. Exhaust gas treatment structure 1 is supported on vehicular body frame 15 by support 20A.

Figure 8:
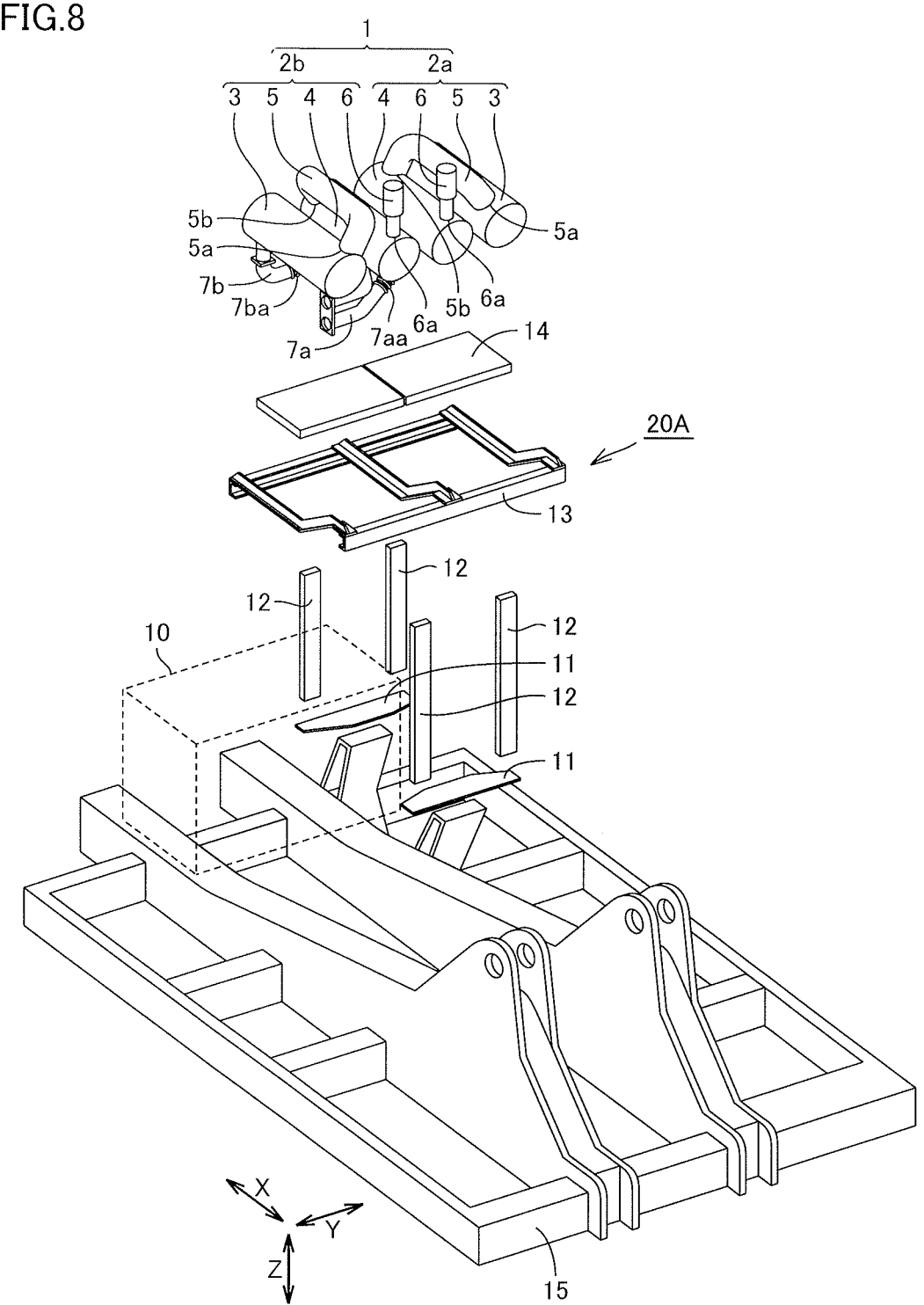
FIG. 8 is an exploded perspective view showing a configuration of a support for supporting the exhaust gas treatment structure on the frame, in an exploded manner.

FIG. 8 is an exploded perspective view showing a configuration of the support for supporting the exhaust gas treatment structure on the frame, in an exploded manner. Referring to FIG. 8, support 20A has two plate boards 11, four vertical frames (pillar members) 12, a lateral frame 13, two sub brackets 14, and a plurality of small brackets 141 (FIG. 6), as shown in FIG. 8.

Each of two plate boards 11 has a flat plate shape, and is attached to vehicular body frame 15. Each of four vertical frames 12 has a pillar shape, and is attached to plate board 11. Each of four vertical frames 12 extends upward of engine 10 from the position where it is attached to plate board 11.

Lateral frame 13 is attached to vertical frames 12, and has two frame portions separated for example in the Y direction. One of the two frame portions of lateral frame 13 is a portion for supporting diesel particulate filter device 3 and selective catalytic reduction device 4 of assembly 2a, and the other of the two frame portions of lateral frame 13 is a portion for supporting diesel particulate filter device 3 and selective catalytic reduction device 4 of assembly 2b.

Each of two sub brackets 14 has a flat plate shape. One of two sub brackets 14 is attached to one of the two frame portions of lateral frame 13, and the other of two sub brackets 14 is attached to the other of the two frame portions of lateral frame 13.

The plurality of small brackets 141 include two brackets supporting diesel particulate filter device 3 of assembly 2a, two brackets supporting selective catalytic reduction device 4 of assembly 2a, two brackets supporting diesel particulate filter device 3 of assembly 2b, and two brackets supporting selective catalytic reduction device 4 of assembly 2b.

The brackets supporting diesel particulate filter device 3 of assembly 2a and the brackets supporting selective catalytic reduction device 4 of assembly 2a are attached to one of two sub brackets 14. The brackets supporting diesel particulate filter device 3 of assembly 2b and the brackets supporting selective catalytic reduction device 4 of assembly 2b are attached to the other of two sub brackets 14.

By rubber dampers 16 and support 20A as described above, engine 10 and exhaust gas treatment structure 1 are supported on vehicular body frame 15 independently of each other. Rubber dampers 16 may be attached to plate boards 11 of support 20A, or may be attached to vehicular body frame 15.

Next, a configuration for feeding urea to the selective catalytic reduction devices of the exhaust gas treatment structure will be described with reference to FIGS. 4 and 9.

Figure 9:
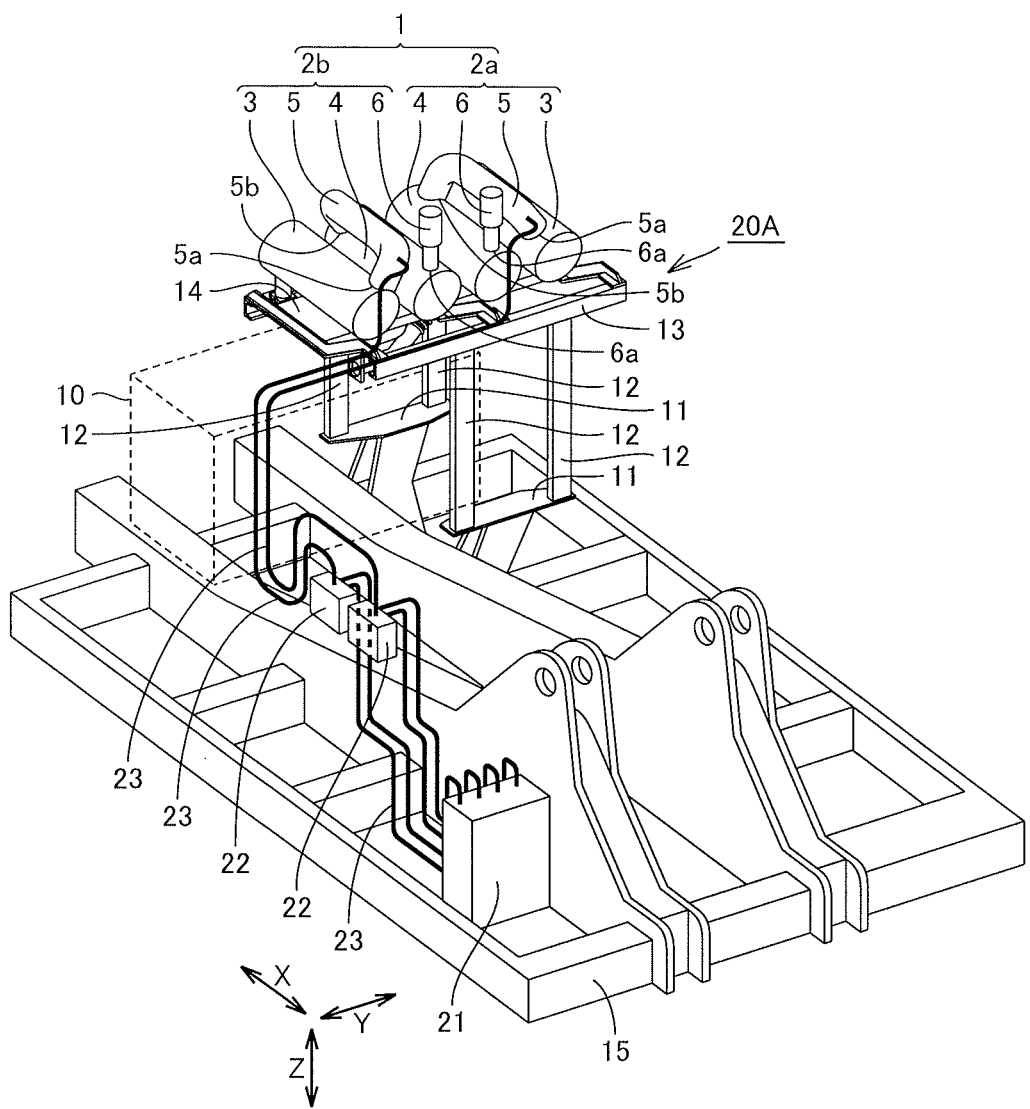
FIG. 9 is a schematic perspective view showing a configuration in which mixing pipes of the exhaust gas treatment structure and an aqueous urea solution tank are connected by aqueous urea solution pipes.

FIG. 9 is a schematic perspective view showing a configuration in which the mixing pipes of the exhaust gas treatment structure and an aqueous urea solution tank (reducing agent tank) are connected by aqueous urea solution pipes (reducing agent pipes). Referring to FIG. 9, selective catalytic reduction device 4 is configured to selectively reduce nitrogen oxide $NO_x$, through hydrolysis of, for example, an aqueous urea solution. A device is therefore necessary that feeds urea to selective catalytic reduction device 4.

This urea feeding device mainly has aqueous urea solution tank 21, a pump 22, and aqueous urea solution pipes 23.

Aqueous urea solution tank 21 is configured to be able to store the aqueous urea solution. Aqueous urea solution tank 21 is arranged, for example, outside the engine compartment, and is supported on vehicular body frame 15.

Aqueous urea solution pipes 23 connect aqueous urea solution tank 21 and mixing pipes 5 to each other. By means of aqueous urea solution pipes 23, the aqueous urea solution stored in aqueous urea solution tank 21 can be guided into two respective mixing pipes 5.

Pump 22 is arranged at a certain location along paths of aqueous urea solution pipes 23. Pump 22 performs a function of pumping the aqueous urea solution from aqueous urea solution tank 21 through aqueous urea solution pipes 23 to two respective mixing pipes 5.

By driving pump 22 of the urea feeding device described above, the aqueous urea solution stored in aqueous urea solution tank 21 is fed through aqueous urea solution pipes 23 and injected into two respective mixing pipes 5.

Further, in the urea feeding device described above, aqueous urea solution pipes 23 are connected to two respective mixing pipes 5, from the same side (front side in the drawing) in the longitudinal direction (X direction), as shown in FIG. 4. Portions where aqueous urea solution pipes 23 are connected to mixing pipes 5 are located upstream of the exhaust paths in mixing pipes 5. Accordingly, the aqueous urea solution fed and injected into mixing pipes 5 can be mixed uniformly with exhaust gas while flowing from upstream to downstream in mixing pipes 5.

Figure 10:
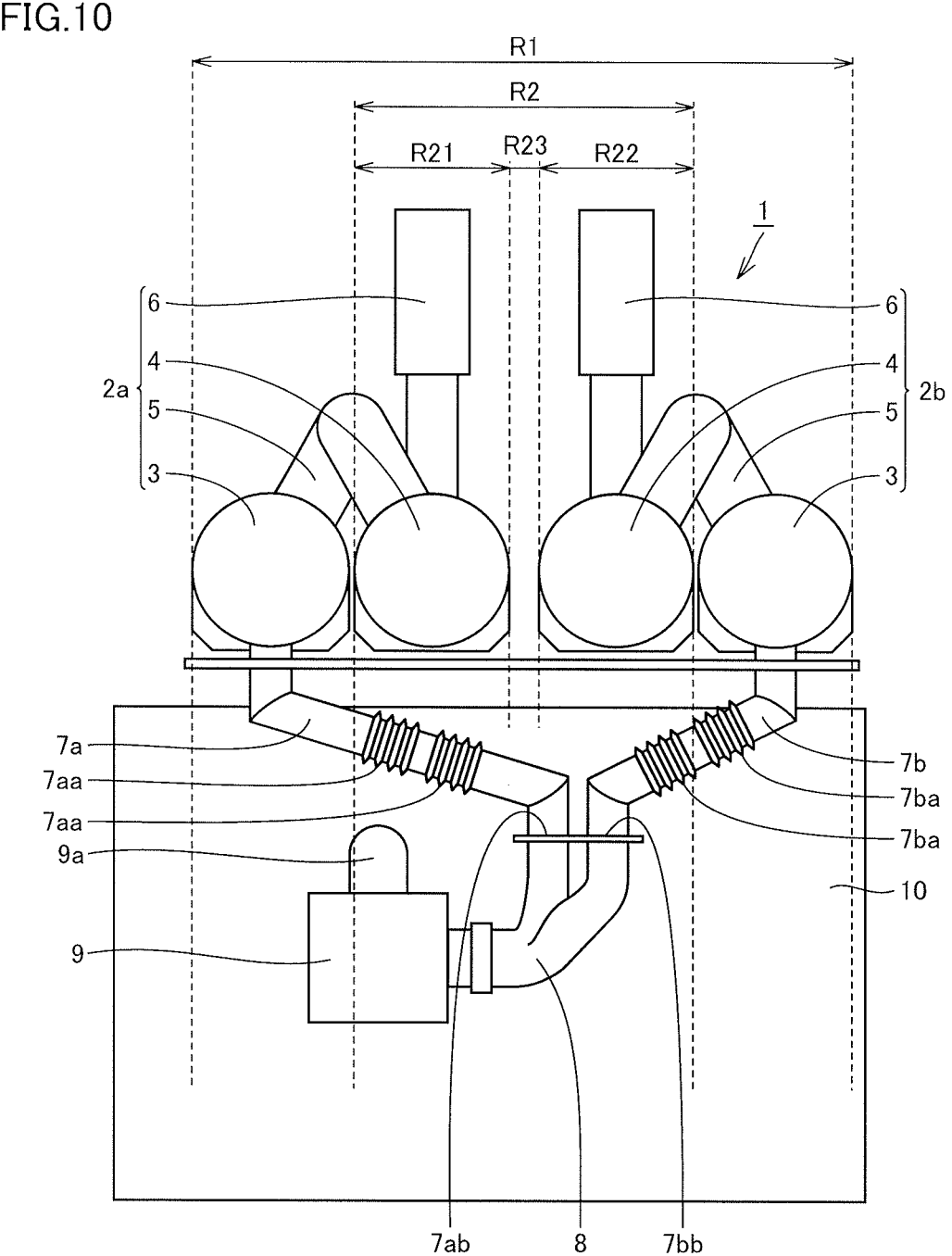
FIG. 10 is a back view schematically showing a configuration of a variation of the connection pipes.

Although the configuration in which exhaust gas treatment structure 1 is arranged to be partially misaligned from the region directly above engine 10 as shown in FIG. 5 has been described above, exhaust gas treatment structure 1 may be entirely arranged in the region directly above engine 10 as shown in FIG. 10.

Also in the configuration as shown in FIG. 10, two sets of assemblies 2a, 2b are arranged such that diesel particulate filter device 3 of assembly 2a as a first set, selective catalytic reduction device 4 of assembly 2a as the first set, selective catalytic reduction device 4 of assembly 2b as a second set, and diesel particulate filter device 3 of assembly 2b as the second set are located next to each other in this order.

Further, respective first and second connection pipes 7a, 7b are routed through the region directly underneath arrangement region R2 where two selective catalytic reduction devices 4 and the like are arranged, and connected to respective diesel particulate filter devices 3.

Other than that, the configuration shown in FIG. 10 is substantially identical to the configurations shown in FIGS. 1 to 9. Accordingly, identical elements will be designated by the same reference numerals, and the description thereof will not be repeated.

Figure 11:
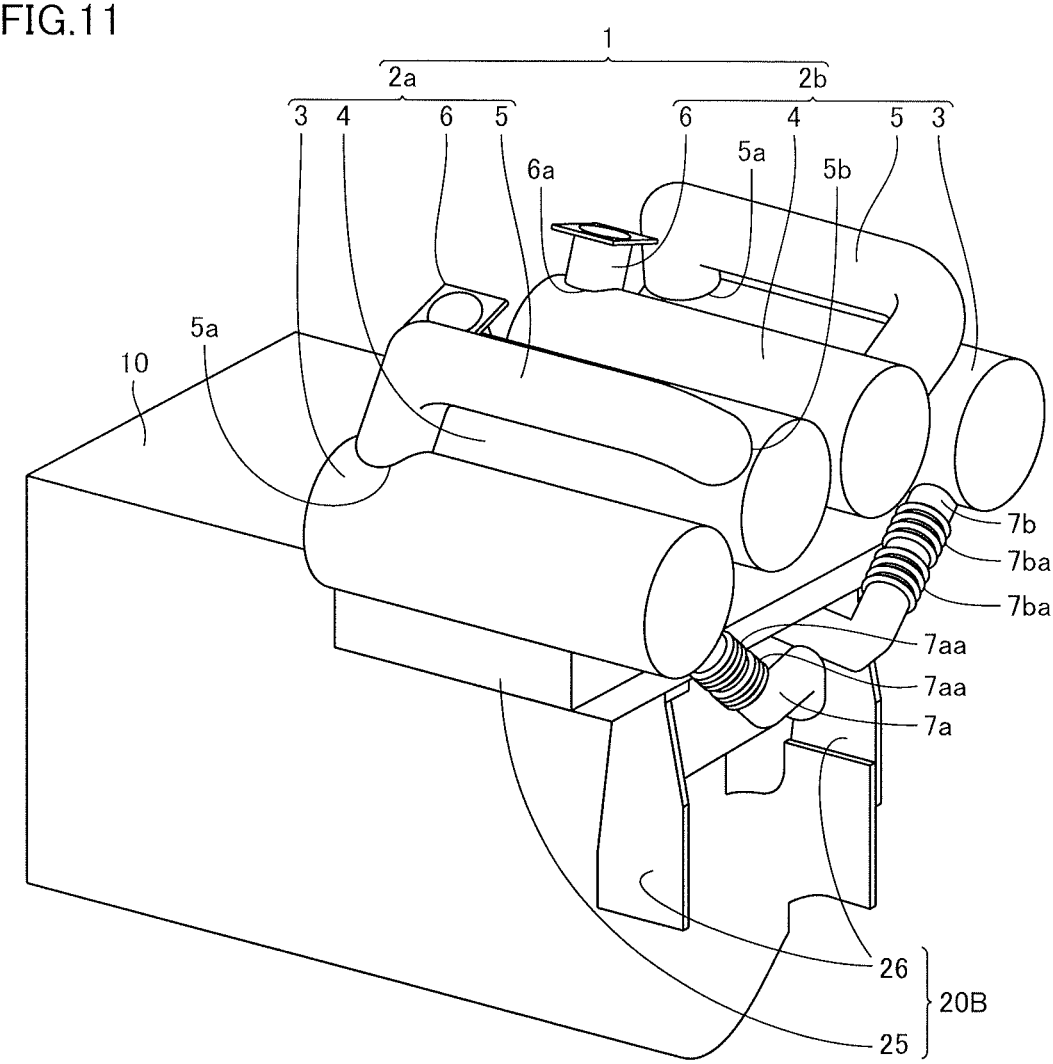
FIG. 11 is a perspective view schematically showing a configuration in which the exhaust gas treatment structure is supported on the engine.

In addition, although the configuration in which exhaust gas treatment structure 1 and engine 10 are supported on vehicular body frame 15 independently of each other as shown in FIGS. 6 to 8 has been described above, exhaust gas treatment structure 1 may be supported on engine 10 with a support 20B interposed therebetween as shown in FIG. 11. Support 20B in this configuration has, for example, a support table 25 for supporting exhaust gas treatment structure 1 on engine 10, and connection portions 26 for connecting support table 25 to engine 10. Connection portions 26 are joined to engine 10 with, for example, bolts or the like.

Also in the configuration as shown in FIG. 11, two sets of assemblies 2a, 2b are arranged such that diesel particulate filter device 3 of assembly 2a as a first set, selective catalytic reduction device 4 of assembly 2a as the first set, selective catalytic reduction device 4 of assembly 2b as a second set, and diesel particulate filter device 3 of assembly 2b as the second set are located next to each other in this order.

Further, respective first and second connection pipes 7a, 7b are routed through a region directly underneath an arrangement region where two selective catalytic reduction devices 4 are arranged, and connected to respective diesel particulate filter devices 3.

Other than that, the configuration shown in FIG. 11 is substantially identical to the configurations shown in FIGS. 1 to 9. Accordingly, identical elements will be designated by the same reference numerals, and the description thereof will not be repeated.

Next, an arrangement of an air cleaner and the like connected to an air intake side of the engine will be described with reference to FIGS. 12 to 15.

Figure 12:
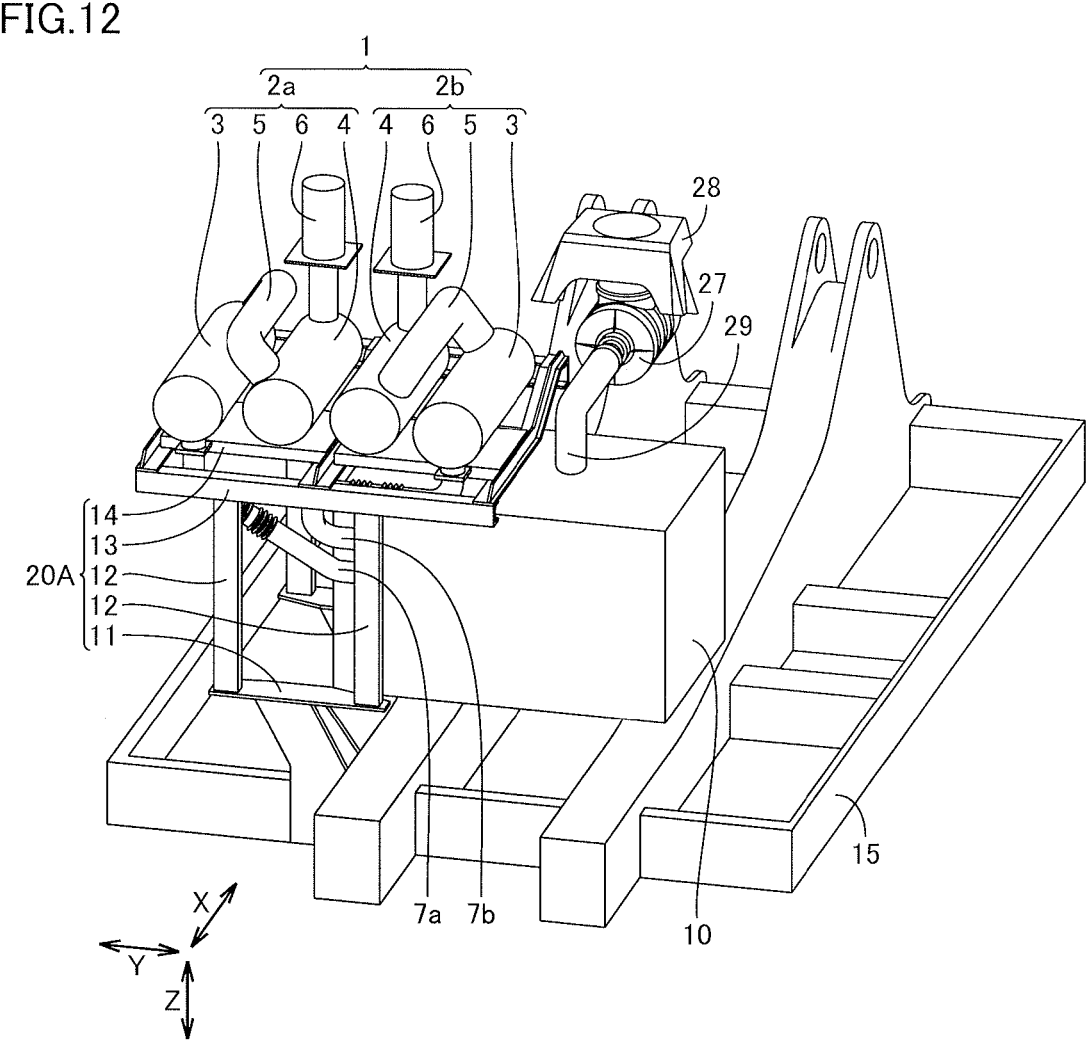
FIG. 12 is a schematic perspective view showing a manner in which an air cleaner is connected to an air intake side of the engine, from diagonally backward.

FIG. 12 is a schematic perspective view showing a manner in which an air cleaner is connected to an air intake side of the engine, from diagonally backward. Referring to FIG. 12, an air cleaner 27 is connected to the air intake side of engine 10, with a pipe 29 interposed therebetween. Air cleaner 27 is provided to filter the air to be taken into engine 10 and prevent foreign matter such as dust from entering a combustion chamber.

Air cleaner 27 is arranged, for example, lateral to exhaust gas treatment structure 1 (in the Y direction), to be spaced therefrom. Specifically, as seen in a plan view, air cleaner 27 is arranged adjacent to diesel particulate filter device 3 of assembly 2b, to be spaced therefrom. An umbrella portion 28 is provided to cover over an inlet of air cleaner 27.

Figure 13:
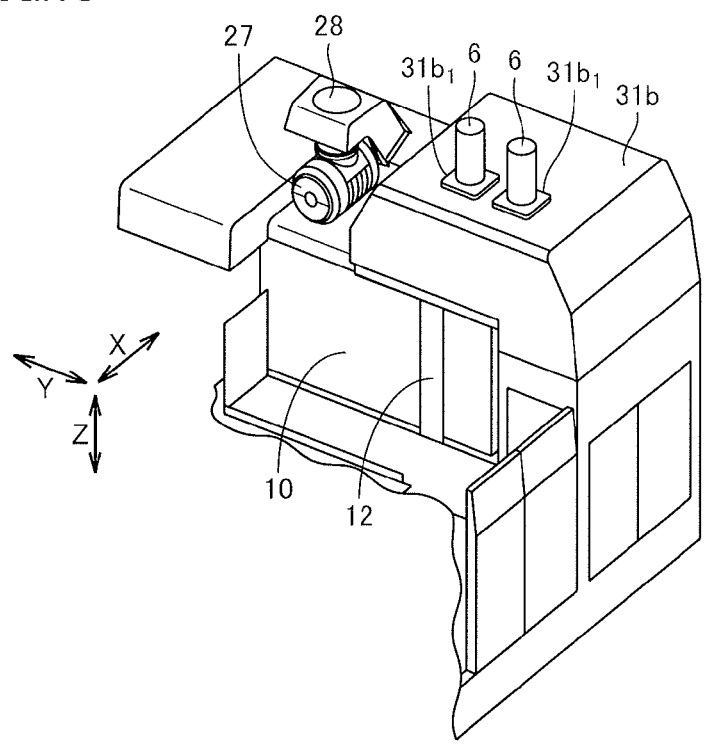
FIG. 13 is a schematic perspective view from forward showing a configuration in which the air cleaner and an umbrella portion are externally attached to the outside of an engine hood.

Air cleaner 27 may be externally attached to the outside of engine hood 31b, as shown in FIG. 13. In this configuration, umbrella portion 28 is located outside engine hood 31b to cover over the inlet of air cleaner 27.

Figure 14:
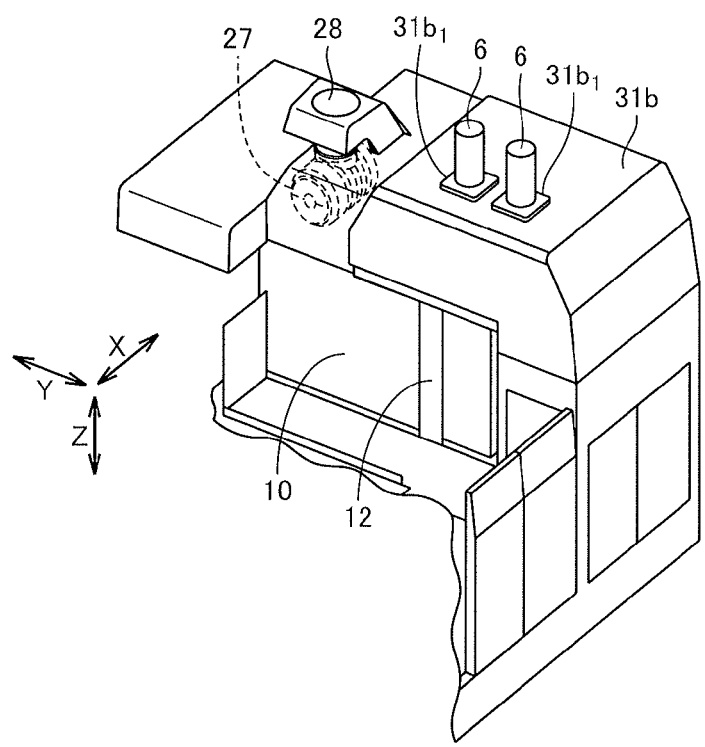
FIG. 14 is a schematic perspective view from forward showing a configuration in which the air cleaner is internally mounted inside the engine hood and the umbrella portion is located outside the engine hood.

Air cleaner 27 may also be internally mounted inside engine hood 31b, as shown in FIG. 14. In this configuration, the inlet of air cleaner 27 is opened upward, and umbrella portion 28 is located outside engine hood 31b to cover over the inlet.

Figure 15:
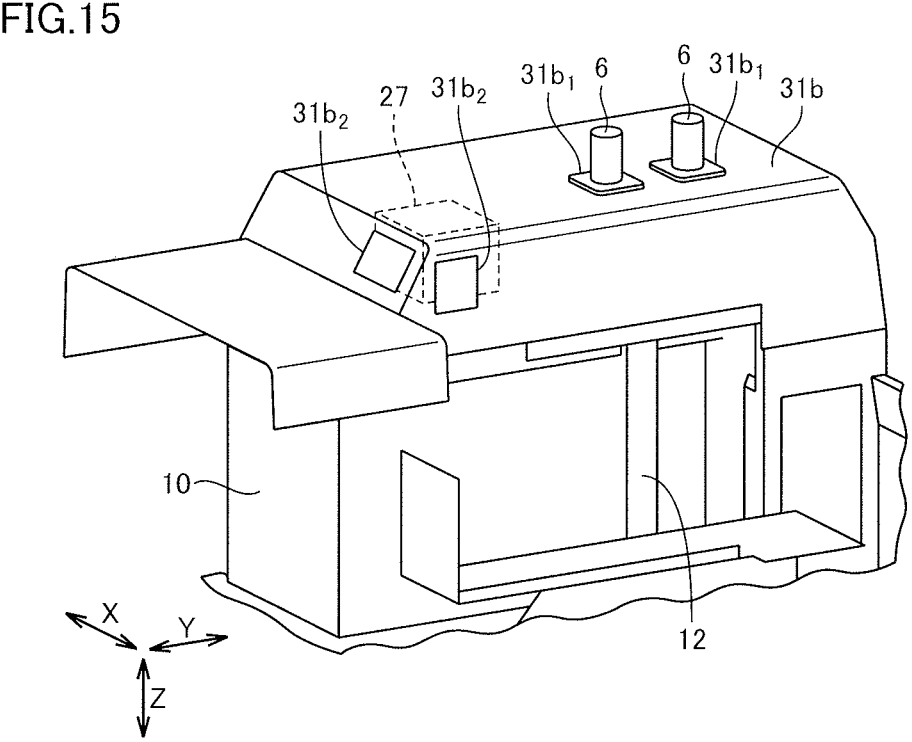
FIG. 15 is a schematic perspective view from forward showing a configuration in which the air cleaner is internally mounted inside the engine hood and no umbrella portion is provided.

Further, air cleaner 27 may be internally mounted inside engine hood 31b and the umbrella portion may be omitted, as shown in FIG. 15. In this configuration, an inlet $31b_2$ is provided in either a front-side surface or a lateral-side surface of engine hood 31b.

Next, the functions and effects of the present embodiment will be described.

According to the present embodiment, since two assemblies 2a, 2b are provided as exhaust gas treatment structure 1, exhaust gas treatment capability can be improved, and a sufficient exhaust gas treatment capability can be obtained even for a work vehicle equipped with large engine 10.

Further, as shown in FIG. 4, two selective catalytic reduction devices 4 adjacent to each other are respectively provided with exhaust tubes 6, and two exhaust tubes 6 are arranged on the same end side (the side opposite to gas inlets 5b) in longitudinal directions B1, B2 of two selective catalytic reduction devices 4. Thus, two exhaust tubes 6 can be positioned to be close to each other, and the direction in which the exhaust gas flows can be easily recognized. Therefore, an air intake position can be easily set to a position from which the exhaust gas from engine 10 is less likely to be taken in.

Further, as shown in FIG. 1, two holes $31b_1$ for two exhaust tubes 6 provided in engine hood 31b at positions for respectively passing two exhaust tubes 6 therethrough are located close to each other, which simplifies the configuration of engine hood 31b and facilitates manufacturing of the engine hood.

Further, as shown in FIG. 4, diesel particulate filter device 3 and selective catalytic reduction device 4 of assembly 2a are arranged separately with gap GA therebetween, as seen in a plan view. Selective catalytic reduction device 4 of assembly 2a and selective catalytic reduction device 4 of assembly 2b are arranged separately with gap GB therebetween, as seen in a plan view. Selective catalytic reduction device 4 and diesel particulate filter device 3 of assembly 2b are arranged separately with gap GA therebetween, as seen in a plan view. Thereby, constituent devices 3, 4 can be arranged closely, with gaps therebetween.

Further, as shown in FIG. 4, each of gap GA between diesel particulate filter device 3 and selective catalytic reduction device 4 in each of assemblies 2a, 2b and gap GB between selective catalytic reduction devices 4 is smaller than diameters D1, D2 of two respective mixing pipes 5. Thereby, constituent devices 3, 4 of exhaust gas treatment structure 1 can be arranged closely in the Y direction, and thus exhaust gas treatment structure 1 can be arranged in a compact manner.

Further, as shown in FIG. 5, respective first and second connection pipes 7a, 7b are routed through the region directly underneath region R2 where two selective catalytic reduction devices 4 and the like are arranged, and connected to respective diesel particulate filter devices 3. By routing first and second connection pipes 7a, 7b as described above, first and second connection pipes 7a, 7b can be ensured to have long lengths while being arranged under exhaust gas treatment structure 1. Thus, even when there occurs an error in the positions of engine 10 and exhaust gas treatment structure 1 caused by an error in processing and assembling support 20A supporting exhaust gas treatment structure 1, and deflection of support 20A due to the weight of exhaust gas treatment structure 1, the above error can be absorbed by the lengths of first and second connection pipes 7a, 7b and expandable bellows parts 7aa, 7ba. Therefore, also in the configuration provided with two assemblies 2a, 2b, connection between engine 10 and exhaust gas treatment structure 1 is facilitated.

Further, since first and second connection pipes 7a, 7b can be ensured to have long lengths, a vibration difference between the vibration of vehicular body frame 15 and the vibration of engine 10 can be absorbed by the lengths of first and second connection pipes 7a, 7b and expandable bellows parts 7aa, 7ba. Therefore, also in the configuration provided with two assemblies 2a, 2b, a load due to the above vibration difference can be suppressed from acting on first and second connection pipes 7a, 7b.

Further, since first and second connection pipes 7a, 7b can be ensured to have long lengths, lengths of bellows parts 7aa, 7ba can be easily increased. This further facilitates the absorption of the error in position and the vibration difference described above.

Further, as shown in FIG. 5, connection ends 7ab, 7bb of respective first and second connection pipes 7a, 7b on the side close to engine 10 are located in region R1 directly underneath exhaust gas treatment structure 1. Namely, connection ends 7ab, 7bb are located in any of the region directly underneath assembly 2a, the region directly underneath assembly 2b, and the region directly underneath region R23 between assembly 2a and assembly 2b. Thereby, connection ends 7ab, 7bb of respective first and second connection pipes 7a, 7b on the side close to engine 10 can be provided close to exhaust gas treatment structure 1, and thus exhaust gas treatment structure 1 and engine 10 can be arranged in a compact manner while ensuring long lengths of first and second connection pipes 7a, 7b.

Further, as shown in FIG. 5, connection ends 7ab, 7bb of respective first and second connection pipes 7a, 7b on the side close to engine 10 are located in the region directly underneath arrangement region R2 where two selective catalytic reduction devices 4 and the like are arranged. Namely, connection ends 7ab, 7bb are located in any of the region directly underneath selective catalytic reduction device 4 of assembly 2a, the region directly underneath selective catalytic reduction device 4 of assembly 2b, and the region directly underneath region R23 between selective catalytic reduction device 4 of assembly 2a and selective catalytic reduction device 4 of assembly 2b. Thereby, connection ends 7ab, 7bb of respective first and second connection pipes 7a, 7b on the side close to engine 10 can be provided close to selective catalytic reduction devices 4, and thus exhaust gas treatment structure 1 and engine 10 can be arranged in a more compact manner while ensuring long lengths of first and second connection pipes 7a, 7b.

Further, as shown in FIGS. 6 and 7, engine 10 and exhaust gas treatment structure 1 are supported on vehicular body frame 15 independently of each other. Thereby, engine 10 and exhaust gas treatment structure 1 can be installed or removed independently of each other, which facilitates installation and maintenance.

Further, when exhaust gas treatment structure 1 is supported on engine 10 as shown in FIG. 11, exhaust gas treatment structure 1 and engine 10 can be arranged in a compact manner.

Further, when respective longitudinal directions A1, A2 of two diesel particulate filter devices 3 are parallel to each other as seen in a plan view as shown in FIG. 4, respective gas inlets 3a of two diesel particulate filter devices 3 are arranged to include virtual plane C orthogonal to both longitudinal directions A1, A2. This facilitates connection of first and second connection pipes 7a, 7b to respective diesel particulate filter devices 3, and facilitates assembling and maintenance.

Further, as seen in a plan view shown in FIG. 4, diesel particulate filter device 3 and selective catalytic reduction device 4 of assembly 2a are arranged line-symmetrically to diesel particulate filter device 3 and selective catalytic reduction device 4 of assembly 2b with respect to virtual line D extending in the longitudinal direction between two selective catalytic reduction devices 4. This facilitates design of exhaust gas treatment structure 1.

Further, as shown in FIGS. 4 and 9, aqueous urea solution pipes 23 are connected to two respective mixing pipes 5, from the same side (upper side in the drawing) in the longitudinal direction. This facilitates maintaining the temperature of the aqueous urea solution supplied into mixing pipes 5 at an appropriate temperature, which will be described below.

Referring to FIG. 9, appropriate temperature control is required for the aqueous urea solution stored in aqueous urea solution tank 21. Specifically, aqueous urea solution tank 21 is preferably arranged to be away from a high-temperature environment, because ammonia tends to be generated from the aqueous urea solution in aqueous urea solution tank 21 when the temperature inside aqueous urea solution tank 21 exceeds 50 to 60° C. Since the temperature inside the engine compartment is relatively high due to heat generation of engine 10 and the like, it is preferable to arrange aqueous urea solution tank 21 to be away from the engine compartment, and minimize path lengths of aqueous urea solution pipes 23 passing through the engine compartment when aqueous urea solution pipes 23 extend from aqueous urea solution tank 21 to reach mixing pipes 5.

Here, in the present embodiment, aqueous urea solution tank 21 is arranged outside the engine compartment. Aqueous urea solution pipes 23 are connected to two respective mixing pipes 5, from the same side in the longitudinal direction. Further, the portions where aqueous urea solution pipes 23 are connected to mixing pipes 5 are located on the same side as the side on which aqueous urea solution tank 21 is arranged, with respect to the engine compartment. This can decrease the path lengths of aqueous urea solution pipes 23 passing through the engine compartment. Therefore, the aqueous urea solution flowing through aqueous urea solution pipes 23 is less likely to be influenced by the heat inside the engine compartment, which facilitates maintaining the temperature of the aqueous urea solution supplied into mixing pipes 5 at an appropriate temperature.

Further, since aqueous urea solution pipes 23 are connected to two respective mixing pipes 5 from the same side (upper side in the drawing) in the longitudinal direction, pipe paths of aqueous urea solution pipes 23 can be simplified.

Further, as shown in FIG. 4, aqueous urea solution pipes 23 are connected to upstream end portions of the exhaust paths in mixing pipes 5. Accordingly, the aqueous urea solution fed and injected into mixing pipes 5 can be dispersed uniformly into exhaust gas while flowing from the upstream end portions to downstream end portions in mixing pipes 5.

Further, as seen in a plan view shown in FIG. 4, a clearance between diesel particulate filter device 3 and selective catalytic reduction device 4 of assembly 2a overlaps mixing pipe 5. Furthermore, as seen in a plan view shown in FIG. 4, a clearance between diesel particulate filter device 3 and selective catalytic reduction device 4 of assembly 2b overlaps mixing pipe 5. Thereby, constituent devices 3, 4 of exhaust gas treatment structure 1 can be arranged closely in the Y direction, and thus exhaust gas treatment structure 1 can be arranged in a compact manner.

Further, as shown in FIG. 5, bellows part 7aa includes two bellows portions, and bellows part 7ba also includes two bellows portions. This can prevent resonance and facilitates connection of respective first and second connection pipes 7a, 7b.

Further, as shown in FIG. 5, second connection pipe 7b has a portion which turns, after second connection pipe 7b extends to one direction in the Y direction from connection end 7ab on the side close to engine 10, in a direction opposite to the one direction. Since second connection pipe 7b has a turning portion as described above, second connection pipe 7b can be ensured to have a long length while being arranged under exhaust gas treatment structure 1.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: exhaust gas treatment structure; 2a, 2b: assembly; 3: diesel particulate filter device; 3a, 5b: gas inlet; 4: selective catalytic reduction device; 5: mixing pipe; 5a, 6a: gas outlet; 6: exhaust tube; 7a: first connection pipe; 7b: second connection pipe; 7aa, 7ba: bellows part; 7ab: connection end; 8: branch pipe; 9: supercharger; 9a: exhaust port; 10: engine; 11: plate board; 12: vertical frame; 13: lateral frame; 14: sub bracket; 15: vehicular body frame; 16: rubber damper; 20A, 20B: support; 21: aqueous urea solution tank; 22: pump; 23: aqueous urea solution pipe; 25: support table; 26: connection portion; 27: air cleaner; 28: umbrella portion; 29: pipe; 30: hydraulic excavator; 31: revolving superstructure; 31a: cab; 31b: engine hood; $31b_1$: hole for exhaust tube; $31b_2$: inlet; 31c: counterweight; 32: work implement; 32a: boom; 32b: arm; 32c: bucket; 40: travel base structure; 50: crawler belt device.

The invention claimed is:

1. An engine unit, comprising:
an engine;
a first exhaust gas treatment device treating exhaust gas from said engine;
a second exhaust gas treatment device treating the exhaust gas that has passed through said first exhaust gas treatment device;
a third exhaust gas treatment device treating the exhaust gas from said engine;
a fourth exhaust gas treatment device treating the exhaust gas that has passed through said third exhaust gas treatment device;
a first exhaust pipe extending upward from a gas outlet of said second exhaust gas treatment device; and
a second exhaust pipe extending upward from a gas outlet of said fourth exhaust gas treatment device, wherein
said first to fourth exhaust gas treatment devices are arranged to be located next to each other in an order of said first exhaust gas treatment device, said second exhaust gas treatment device, said fourth exhaust gas treatment device, and said third exhaust gas treatment device, such that respective longitudinal directions thereof are arranged in parallel, and
said first exhaust pipe of said second exhaust gas treatment device and said second exhaust pipe of said fourth exhaust gas treatment device are arranged to be located next to each other on the same end side in said longitudinal direction of said second exhaust gas treatment device and said longitudinal direction of said fourth exhaust gas treatment device.

2. The engine unit according to claim 1, wherein said first exhaust gas treatment device and said second exhaust gas treatment device, said second exhaust gas treatment device and said fourth exhaust gas treatment device, and said fourth exhaust gas treatment device and said third exhaust gas treatment device are each arranged separately with a gap therebetween, as seen in a plan view.

3. The engine unit according to claim 1, further comprising:
   a first intermediate connection pipe connecting between said first exhaust gas treatment device and said second exhaust gas treatment device; and
   a second intermediate connection pipe connecting between said third exhaust gas treatment device and said fourth exhaust gas treatment device, wherein
   each of a gap between said first exhaust gas treatment device and said second exhaust gas treatment device, a gap between said second exhaust gas treatment device and said fourth exhaust gas treatment device, and a gap between said fourth exhaust gas treatment device and said third exhaust gas treatment device is smaller than a diameter of said first intermediate connection pipe and a diameter of said second intermediate connection pipe, as seen in a plan view.

4. A work vehicle having said engine unit according to claim 1.

* * * * *